United States Patent [19]

Maxwell et al.

[11] Patent Number: 4,882,765
[45] Date of Patent: Nov. 21, 1989

[54] DATA TRANSMISSION SYSTEM

[76] Inventors: Ray F. Maxwell, 7021 Parkview Place, Delta, British Columbia, Canada, V4E 2N3; Robert D. White, 72054 88th Avenue, Surrey, British Columbia, Canada, V3W 3J2

[21] Appl. No.: 52,880

[22] Filed: May 22, 1987

[51] Int. Cl.⁴ .............................................. H04B 7/14
[52] U.S. Cl. ...................................... 455/18; 455/11; 370/13.1
[58] Field of Search .................. 455/18, 20, 21, 11, 455/15; 370/13.1, 13, 14, 15; 371/32, 33

[56] References Cited

U.S. PATENT DOCUMENTS

| | | | |
|---|---|---|---|
| 2,642,524 | 6/1953 | Bayliss | 250/6 |
| 3,745,462 | 7/1973 | Trimble | 325/22 |
| 3,754,211 | 8/1973 | Rocher et al. | 371/33 |
| 3,781,684 | 12/1973 | Inslerman | 325/5 |
| 3,955,140 | 5/1976 | Stephens | 325/4 |
| 4,152,647 | 5/1979 | Gladden et al. | 455/11 |
| 4,402,075 | 8/1983 | Bargeton et al. | 370/15 |
| 4,479,245 | 10/1984 | Batlivala et al. | 455/18 |
| 4,546,467 | 10/1985 | Yamamoto | 370/13 |
| 4,577,327 | 3/1986 | Nambu | 455/15 |
| 4,584,684 | 4/1986 | Nagasawa et al. | 371/33 |
| 4,586,086 | 4/1986 | Ohzeki | 371/33 |
| 4,639,937 | 1/1987 | McRae et al. | 455/18 |

OTHER PUBLICATIONS

P. Callens, IBM Technical Disclosure Bulletin, Jan. 1983, vol. 25, No. 8, p. 4479.

*Primary Examiner*—Robert L. Griffin
*Assistant Examiner*—Ralph E. Smith
*Attorney, Agent, or Firm*—Cecil A. Rowley; Donald B. Southard

[57] ABSTRACT

Data is transmitted from a mobile or a base station to a booster or repeater station which, if it identifies that the same message has been retransmitted a preset number of times by the mobile or base station it automatically retransmits the data. The number of times a message has been retransmitted may be coded on each message or determined by comparing the retransmitted messages with a previously sent message that will have been stored in memory by the repeater and when the message in memory and retransmitted message are the same, registering another transmission of the message until the preset number is registered and then retransmitting the message preferrably from memory. In another arrangement the relay station receives and stores or otherwise identifies data from the mobile or base and listens for an acknowledgement from the receiving station, if no acknowledgement is received within a preset period of time the message is automatically retransmitted by the relay station. In either case the first time a message is received it will not except in certain circumstances be retransmitted by the repeater.

15 Claims, 1 Drawing Sheet

DATA TRANSMISSION SYSTEM

FIELD OF THE INVENTION

The present invention relates to a data transmission systems. More specifically, the present invention relates to a repeater station that only repeats messages when it senses the receiving station has not received the message or data from the sending or transmitting station.

BACKGROUND TO THE PRESENT INVENTION

It is well known to relay messages from one station to another through a relay station. Such arrangements are of particular importance when the range of, say, a mobile transmitting and/or receiving station is relatively small compared to that of the base station, or in areas where signal transmissions are obstructed or impaired. In such systems the general mode of operation is for the relay station simply to automatically repeat all messages.

In one such repeater arrangement wherein two frequencies are used, the base station transmits and receives on both frequencies. This system uses a relay station that receives on, say, the first frequency and automatically retransmits on the second frequency, whereas the mobile stations each receive on the second frequency and transmit on the first frequency. In operation, the base station transmits the same message on both frequencies, the first of which is received by the relay station and automatically retransmitted on the second frequency, while the mobile stations if within the range of the base station, receives the message transmitted on the second frequency from both the base station and the relay station. The relay will operate in the reverse in the event the mobile transmits a message on the second frequency. In this case, the relay will repeat that message and retransmit again on the second frequency, this time for the benefit of the base station. When the mobile is in range of the base the base will receive the message from both the mobile and the relay stations, but if out of range only the repeated message from the relay station will be received. Such a system is described in U.S. Pat. No. 2,642,524 issued June 16, 1953 to Bayliss.

Another known system is described in U.S. Pat. No. 3,745,462 issued July 10, 1973 to Trimble. This patent describes a mobile radio extension unit to permit the mobile radio to act as a relay station for say a hand held walkie-talkie or the like unit to permit the walkie talkie to communicate with a base station through the mobile transceiver. In this arrangement suitable controls are provided in the extension unit to interface the same with the mobile transceiver and the portable transceiver, such as a walkie-talkie. The equipment includes means to ensure that only one mobile transceiver receiving signals from the portable transceiver or from the base station retransmits the information to the receiving unit.

None of these prior art units provide a solution to the problem of data transmission between a base station and a mobile station and vice versa in areas where the airways are very crowded and very limited time and frequencies are available to carry the message. In such circumstances, which are now relatively common, it is undesirable to retransmit a message to the base station unless it is clear that the message has not been received, otherwise the airways or frequencies will be bombarded with extra, unnecessary messages and the time available, and thus the number of different messages that can be transmitted on a given frequency will be severely reduced.

BRIEF DESCRIPTION OF THE PRESENT INVENTION

It is an object of the present invention to provide a repeater or relay station that limits the number of messages repeated to those not received by or not expected to be received by the receiving unit.

Broadly the present invention relates to a data transmission system comprising a base station, at least one mobile station and at least one repeater station, each of said stations being adapted to transmit and to receive, computer means associated with said repeater station, said computer means being adapted to identify a message transmitted by one of said base and said mobile stations and received by said repeater station with the number of times said message has been transmitted by said one station, and triggering means to cause said repeater station to retransmit said message when said computer means identifies that said message has been transmitted a preset number of times by said one station.

Preferably said means to identify identifies a coding applied to said message by the transmitting station.

The computer means may also be provided with means to record messages retransmitted by said repeater station and to automatically retransmit an acknowledgement ACK for said retransmitted message.

In a more elegant system, the computer means is further provided with means identifying the transmitting station and receiving station for a message received by said repeater station and for retransmitting that message after it has been received a preset number of times in the manner described and further comprising means for causing said repeater station to retransmit further messages between said two stations for a preset period of time following transmission of said first message by said repeater station.

Another embodiment of the present invention relates to a data transmission system comprising a base station adapted to transmit on a first frequency (F1) and receive on a second frequency (F2) different from said first frequency (F1), at least one mobile station adapted to receive messages transmitted on said first frequency (F1) and to transmit messages on said second frequency (F2) and a repeater station adapted to receive messages on said second frequency (F2) and to retransmit on said second frequency (F2), computer means associated with said repeater station, said computer means being adapted to temporarily store in a memory a first message received on said second frequency (F2) from a mobile station, means to determine whether a subsequent message received on said second frequency (F2) within a preset time of the receipt of said first message is a repeat of said first message, and means to cause said repeater station to retransmit said first message from memory if such a subsequent repeated message is received from said mobile within said preset time.

In the later embodiment, after said preset period of time, if a subsequent message identical with said first message is not received (the requisite number of times to trigger retransmission by said repeater station), the first message will be erased from memory. Alternatively, if said first message is repeated it will be erased from memory and preferably at that time.

In yet another version of the present invention, the repeater station has a further receiving means adapted to receive messages on said first frequency (F1); with this arrangement, the first message received on said second frequency (F2) and stored in memory is automatically repeated if an acknowledgement signal is not received on said first frequency (F1) within a preset period of time. The stored message is erased from memory if it is retransmitted or if an acknowledgement signal is received on said first frequency (F1).

In the later two of the above described systems, it is assumed that all messages from the base station are received by the mobile stations, but the mobile station may have difficulty in communicating with the base station. Normally, in both of the systems, an acknowledgement of a message received is issued by the receiving station and any acknowledgement from the mobile received by the repeater station will automatically be retransmitted by the repeating station. Since such acknowledgements are very short, such repeating of all such acknowledgements in such a system may not significantly reduce the time available to send data.

BRIEF DESCRIPTION OF THE DRAWINGS

Further features, obJects and advantages will be evident from following detailed description of the preferred embodiments of the present invention taken in conjunction with the accompanying drawings in which.

DESCRIPTION OF THE PREFERRED EMBODIMENTS

Figure 1:
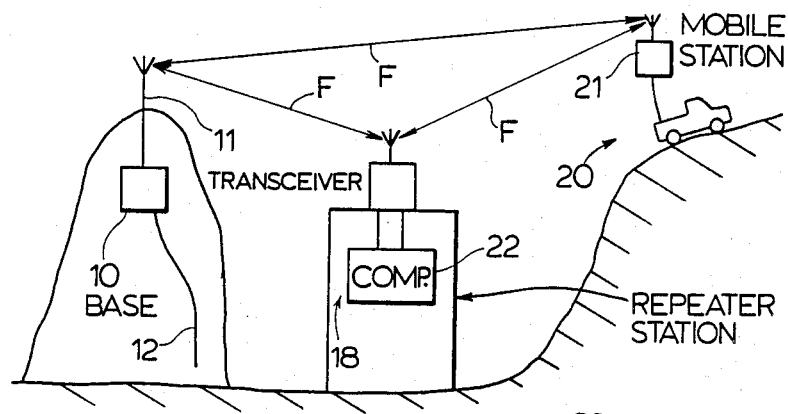
FIG. 1 is a schematic illustration of one embodiment of the present invention.

As shown in FIG. 1 the system comprises a base station generally indicated at 10. Normally station 10 will have a transmitting and receiving unit with an antenna 11 and will be connected to communicate with outside locations via a suitable communications cable or the like as indicated at 12.

There may be any reasonable number of repeater stations but for simplicity only one has been schematically illustrated at 18 and any reasonable number of mobile stations, again only one of which has been schematically illustrated at 20.

In the arrangement shown in FIG. 1 a simple but effective system is illustrated. Only a single frequency F is used for receiving and transmitting messages between the base station and the mobile stations.

Base station 10, mobile station 20 and repeater station 18 all receive and transmit on the same frequency F. In this arrangement each message is provided with a coding, say, in a header to he message indicating the number of times the message has been repeated i.e., if, say, the mobile has transmitted the same message X times, that message will be identified by code indicating that the message currently being transmitted is the X attempt to transmit that message. This coding obviously is applied to the message by the transmitting station. The computer 22 associated with the repeater station 18 examines each message it receives for the code and in this case will determine that this is the X time that this message has been sent by the transmitting station. Assuming the repeater has been preset to retransmit messages repeated X times by the transmitting station, the computer 22 will automatically trigger the repeater station 18 to retransmit the message.

It will be apparent that the above described system may operate to or from the base or the mobile stations or both.

Similarly both data messages and acknowledgements (ACKS) must be transmitted between the base and mobile stations. The computer 22 may be provided a system that records all messages that it retransmits and, since each ACK must identify the message it is acknowledging, the computer 22 may be used to activate the station 18 to repeat the ACK only for those messages that it had previously transmitted.

In some locations where transmission will be difficult. The computer 22 may be adapted to note on, say, a list or the like, all stations between which it has had to repeat messages and to retain that notation on such list for a preset length of time commencing from the last repeated message. As long as such notation remains on the list (say, maximum time 5 minutes or what ever time may be desired), the repeater station 18 will automatically be triggered by the computer 22 to repeat messages between the two stations. The preset time is automatically reset each time a message is retransmitted by station 18. If desired the described automatic repeating within the preset time may be set to operate only for one of the two communicating units, for example, if only the communication from the mobile is having trouble being received by the base station, only the messages from the mobile need be repeated.

The number of retries by a sending station before a message is retransmitted by the repeater 18 may be preset as desired. In some locations where it is expected that retransmission will be required the repeater 18 may be activated by a single retry by the mobile, while in other areas 4 or 5 attempts will be the norm, e.g., a portable (hand carried mobile) may be in and out of buildings and it may be simpler to have the hand unit retry several times before retransmission by the repeater station 18.

It is also possible to operate the systems as above described with suitable modification utilizing two separate frequencies wherein the base station transmits on a first frequency F1 and receives on a second frequency F2 that is different from F1. The mobile stations in turn transmit on frequency F2 and receive on frequency F1, and the repeater receives at least on frequency F2 and transmits on frequency F2. It will be apparent that in the arrangement wherein the repeater only transmits on frequency F2 and the mobiles only receive on F1, the repeater cannot be used to retransmit messages from the base to the mobile 20.

Like reference numerals have been used to indicate like parts throughout the disclosure.

Figure 2:
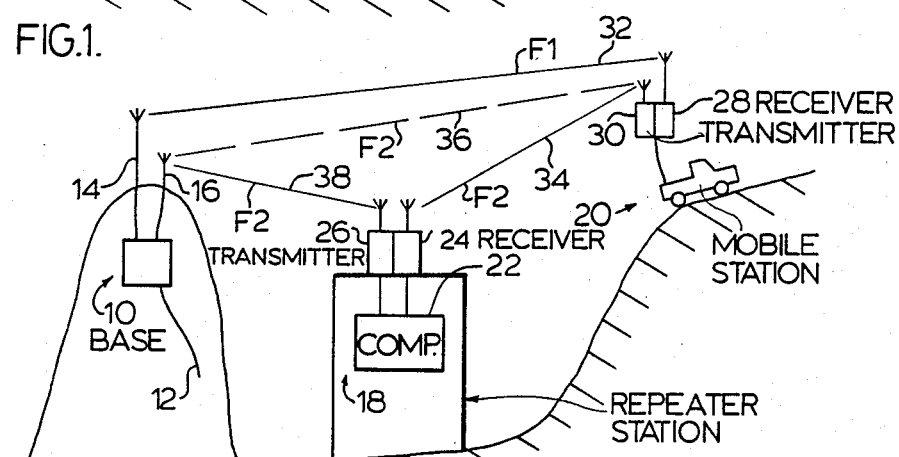
FIG. 2 is a schematic illustration of an embodiment of the present invention using two frequencies.

In the system illustrated in FIG. 2, the base station 10 has a transmitter and transmission antenna as indicated at 14 and a receiver and receiving antenna 16 associated therewith. As above indicated the transmitter 14 transmits on frequency F1 while the receiver 16 receives on frequency F2.

In the arrangement illustrated in FIG. 2, the repeater station 18 includes a computer 22 with a memory, a receiver 24 and a transmitter 26, each with a suitable antenna.

The computer 22 is, in one embodiment, provided with suitable equipment (memory) to store messages (data) received by the receiver 24 for a preset period of time and to determine if subsequent messages received within the preset time are the same as the message stored in memory. The computer 22 is equipped with means to control the operation of the transmitter 26 to relay messages from memory as will be described in more detail hereinbelow.

The mobile unit 20 has a receiver portion 28 tuned to frequency F1 and a transmitting portion 30 that transmits on F2.

With the arrangement of FIG. 2, when the base transmitter 14 transmits a message on a first frequency F1, it is assumed that all messages transmitted by the base station on frequency F1 are received by the mobile 20. On receipt the mobile 20 will transmit via transmitter 30 on the second frequency F2 an acknowledgement of the message received on frequency F1. In the illustration of FIG. 1, the messages from the base station 10 travel along the line indicated at 32 to the mobile station 20. The acknowledgements or messages from the mobile station 20 are transmitted directly to the repeater station 18 as illustrated by line 34 and/or may be received directly by the base station 10 by receiver 16 as indicated by transmission on the line schematically indicated at 36.

A message transmitted, as indicated at 34 and received in the receiving portion 24 of the repeating station 18, is stored in memory in the computer 22. If the same message transmitted along line 36 does not reach the base station 10, for example, because it is beyond the range of the mobile station, the base station obviously will not transmit an acknowledgement and thus the mobile 20 does not receive an acknowledgement. In such an event the mobile is programed or provides with means so that after a preset period of time it will transmit a second or subsequent message identical to the first (or further tagged indicating that it is the second transmission of a previously sent message). The repeated message from the mobile will be received by receiver portion 24 of the repeater station 18 where the first message is stored and will determine the subsequent message is the same as the first message. Receipt of such a subsequent identical message identified as such for example by comparison with the message in memory or coding applied by the mobile station will then cause triggering of the transmitter 26 to retransmit the first message from memory which will be retransmitted at frequency F2 as indicated by the line 38 to the receiving section 16 of the base station 10.

It will be apparent that if the messages are coded as above described to indicate that the message currently being transmitted is a repeat of the previous message there is no necessity for the computer to store the first message in a memory. It is only necessary to sense the coded message and to automatically and immediately retransmit the message only when it is coded as the X transmission of the same message and X is the preset number of times that a message must be retried before the repeater station will retransmit.

While as above described, the triggering for retransmission of the first message by transmitter 26 may occur automatically after the second reception of the same message, this may be set so that triggering the transmitter 26 occurs only after the same message is transmitted by the mobile 20 and received by the repeater 18, say, 3 or 4 times. It is preferred to automatically repeat in the event the same message is retransmitted by the mobile and received by the receiving section 24 within a preset period of time.

After the preset period of time or after retransmission of the message via the transmitter 26 in the case where the message is stored in memory, the computer 22 erases the message from memory.

It will be apparent that not all acknowledgements from the mobile 20 will reach the base 10 directly, since these are very short and thus consume little time, it may be more practical for the repeater station 18 to automatically retransmit all acknowledgement signals received from the mobile stations. In this manner the base station 10 will automatically receive an acknowledgement signal either directly form the mobile 20 or from the repeater 18 or both.

The FIG. 2 arrangement reduces congestion at the base station 10 by only relaying to the base those messages that are retransmitted by the mobile. However it does not alleviate the situation with respect to communication between the mobile and the repeater stations.

Figure 3:
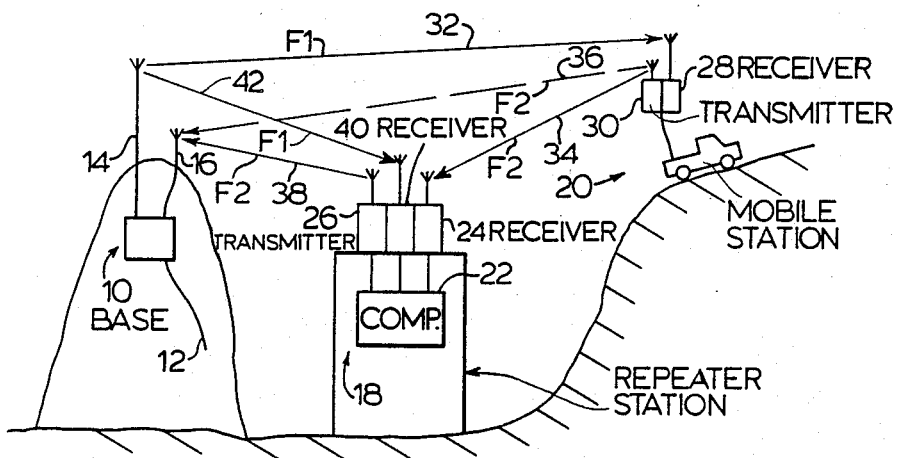
FIG. 3 is a schematic illustration of a two frequency system wherein the repeater station receives on both frequencies.

In the arrangement shown in FIG. 3 like parts have been designated with like references. However in this arrangement, the repeater station 18 is further equipped with a second receiver indicated at 40. This receiver 40 is adapted to receive all acknowledgements transmitted from the base station on frequency F1 via transmitter 14, as schematically indicated via the line 42.

The embodiment of FIG. 3 operates similarly to the embodiment of FIG. 2. However the message received via line 34 by receiver 24 is stored in the memory of the computer 22 and the computer is programed to recognize an acknowledgement received by the receiver portion 40. If no acknowledgement is received by receiver 40 within a preset period of time the computer 22 triggers the operation of the transmitter 26 to transmit the message stored in the computer memory as indicated by the line 38. On the other hand, if an acknowledgement is received within the said preset period of time, no retransmission is effected and the message is removed or erased from the memory. Similarly, if the message is retransmitted, it is then automatically removed or erased from the memory.

In the FIG. 3 arrangement where the mobile stations 20 are adapted to automatically retransmit a message, if they do not receive an acknowledgement from the base station 10 within a preset time, it is important that the time between retransmission by the mobile be sufficiently long to permit the repeater station 18 to react to the lack of acknowledgement from the base station and retransmit and for the base station to acknowledge the message retransmitted by the repeater before the mobile retransmits.

With the FIG. 3 arrangement, all acknowledgements from the mobile 20 are automatically repeated by the repeater 18. However only those messages that are not acknowledged within a preset period of time by the base station 10 are retransmitted.

Having described the invention, modifications will be evident to those skilled in the art without departing from the spirit of the invention as defined in the appended claims.

We claim:

1. A data transmission system, comprising:
   a base station;
   at least one mobile station and a repeater station, each of said stations operating to transmit and to receive;
   computer means associated with said repeater station, said computer means determining, based on contents of a message transmitted by a transmitting station which is one of said base and mobile stations and received by said repeater station, how many times said message had been transmitted by said transmitting station; and trigger means for causing said repeater station to retransmit said message solely when said computer means determines that said message has been retransmitted a preset number of times by said transmitting station.

2. A data transmission system as defined in claim 1 wherein said transmitting station identifies each message it transmits with a code in said message and wherein said computer means identifies said coded message on said message transmitted by said transmitting station.

3. A data transmission system as defined in claim 1 wherein said computer means records identification of messages retransmitted by said repeater station and identifies an acknowledgement of said retransmitted message and automatically retransmits said acknowledgement.

4. A data transmission system as defined in claim 2 wherein said transmitting station identifies each said message with its source and destination and wherein said computer means further comprises means to cause said repeater station to automatically retransmit further messages from said transmitting station destined for a specific receiving station to which said repeater station has retransmitted a previous message from said transmitting station for a preset period of time from retransmission of said previous message by said repeater station.

5. A method of transmitting data in a system having a base station, at least one mobile station and a repeater station, each of said stations operating to transmit and to receive, said method comprising:

identifying each message with a code indicating how many times the transmission of that message has been repeated by the transmitting station;

transmitting said code with said message; and identifying said code at said repeater station and retransmitting said message by said repeater station solely when said code identified at said repeater station indicates said message has been retransmitted by said transmitting station a preset number of times.

6. A method as defined in claim 5 further comprising identifying an acknowledgement of a message retransmitted by said repeater at said repeater station and automatically repeating said acknowledgement by said repeater station.

7. A method as defined in claim 5 further comprising continuing to retransmit all messages received by said repeater station and transmitted from said transmitting station destined for a specific receiving station within a preset time from the last retransmission by said repeater station of a message from said transmitting station destined for said specific receiving station.

8. A data transmission system comprising:

a base station operating to transmit on a first frequency and receive on a second frequency different from said first frequency;

at least one mobile station receiving on said first frequency and transmitting on said second frequency and retransmitting on said second frequency;

computer means associated with said repeater station, said computer means temporarily storing in a memory a first message received on said second frequency from one of said at least one mobile stations;

means to determine if a subsequent message received on said second frequency within a preset time of receipt by said repeater station of said first message from said one mobile station is a repeat of said first message; and means to cause said repeater station to retransmit said first message solely if such a subsequent repeat message is received from said one of said mobile stations within said preset time.

9. A system as defined in claim 8 wherein said computer means determines whether a subsequent message is a repeat of said first message by comparing said subsequent message with said first message.

10. A method for operating a repeater station in a data transmission system including a base station transmitting on a first frequency and receiving on a second frequency different from said first frequency, at least one mobile station receiving on said first frequency and transmitting on said second frequency, said repeater station receiving on said second frequency and retransmitting on said second frequency, said method comprising:

temporarily storing in a memory a first message received by said repeater station on said second frequency from a mobile station;

determining if a subsequent message received on said second frequency by said repeater station within a preset time from receipt of said first message is a repeat of said first message; and retransmitting said first message from memory by said repeater station solely if such subsequent message is a repeat of said first message from said mobile and said subsequent message is received by said repeater station within said preset time.

11. A method as defined in claim 10 wherein said first message is deleted from memory automatically when retransmitted by said repeater station or after a preset period of time.

12. A data transmission system comprising:

a base station transmitting on a first frequency and receiving on a second frequency different from said first frequency;

at least one mobile station receiving on said first frequency and transmitting on said second frequency and a repeater station receiving on said second frequency;

transmitting on said second frequency and receiving acknowledgements on said first frequency;

computer means associated with said repeater station, said computer means temporarily storing in memory a first message received on said second frequency from a mobile station;

means to detect an acknowledgement signal for said first message transmitted on said first frequency; and means in said computer means to trigger retransmission of said first message from memory solely if no acknowledgement is received within said preset period of time.

13. A data transmission system as defined in claim 12 wherein said computer means erases said first message from memory after retransmission by said repeating station or after a predetermined period of time from receipt of said first message by said repeater station.

14. A method of operating a repeater station in a data transmission system including a base station transmitting on a first frequency and receiving on a second frequency and at least one mobile station receiving on said first frequency and transmitting on said second frequency, said repeater station receiving on said second frequency, retransmitting on said second frequency and receiving acknowledgement signals on said first frequency, said method comprising:

temporarily storing in memory a first message received on said second frequency by said repeater station from a mobile station;

sensing for an acknowledgement of said first message received by said repeater station on said first frequency; and retransmitting said first message stored in memory by said repeater station solely if such acknowledgement is not sensed within a preset period of time from receipt of said first message by said repeater station.

15. A method as defined in claim 14 further comprising erasing said first message from memory after retransmission by said repeater station or after said predetermined period of time from receipt of said first message by said repeater station.

* * * * *

UNITED STATES PATENT AND TRADEMARK OFFICE
CERTIFICATE OF CORRECTION

PATENT NO. : 4,882765
DATED : November 21, 1989
INVENTOR(S) : Ray F. Maxwell, et al.

It is certified that error appears in the above-identified patent and that said Letters Patent is hereby corrected as shown below:

On the title page item (73) should read--
--MIT Mobile Information Technology Inc., Richmond, British Columbia, Canada V7G 4Z2 --

Signed and Sealed this

Twenty-seventh Day of October, 1992

Attest:

DOUGLAS B. COMER

Attesting Officer     Acting Commissioner of Patents and Trademarks